United States Patent [19]
Ohkawa et al.

[11] 3,933,847
[45] Jan. 20, 1976

[54] METHOD RELATING TO MANUFACTURE OF COUMARIN DERIVATIVES

[75] Inventors: Masaaki Ohkawa, Takatsuki; Koichi Ishii, Kobe, both of Japan

[73] Assignee: Sumitomo Chemical Company, Limited, Osaka, Japan

[22] Filed: Dec. 19, 1973

[21] Appl. No.: 426,346

[30] Foreign Application Priority Data
Dec. 25, 1972 Japan.................................. 48-2181

[52] U.S. Cl. ............................................. 260/309.2
[51] Int. Cl.[2]....................................... C07D 405/04
[58] Field of Search................................. 260/309.2

[56] References Cited
UNITED STATES PATENTS

| | | | |
|---|---|---|---|
| 3,259,619 | 7/1966 | Siegrist et al. ..................... | 260/240 |
| 3,617,210 | 11/1971 | Dehnert et al. ........................ | 8/178 |
| 3,681,397 | 8/1972 | Knupfer et al. ............... | 260/343.2 R |

FOREIGN PATENTS OR APPLICATIONS

914,347  1/1963  United Kingdom

OTHER PUBLICATIONS
Bukowski et al., Chem. Abstracts 75:63691v (1971).

*Primary Examiner*—G. Thomas Todd
*Attorney, Agent, or Firm*—Wenderoth, Lind & Ponack

[57] ABSTRACT
A coumarin dye of the formula (Ia),

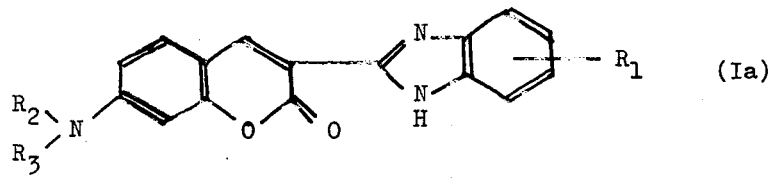

wherein $R_1$ is hydrogen, chlorine or $C_1-C_2$ alkyl, $R_2$ and $R_3$ are hydrogen or $C_1-C_4$ alkyl, or a quarternary salt thereof having the formula (Ib),

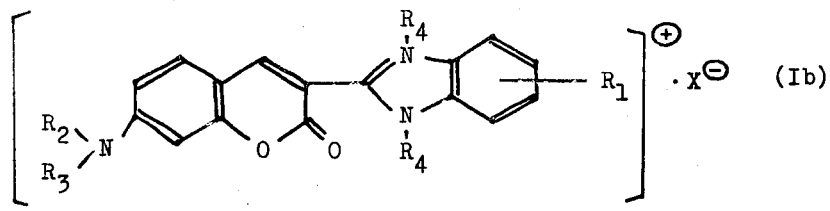

wherein $R_1$, $R_2$ and $R_3$ are as defined above, $R_4$ is $C_1-C_2$ alkyl or benzyl, and $X^-$ is an anion, is prepared by an improved method, which comprises reacting a diamine of the formula,

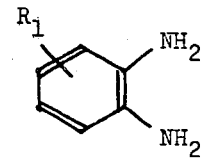

wherein $R_1$ is as defined above, with a compound of the formula,
$$X - CH_2 - Y$$
wherein X and Y are the same or different and are carboxyl, carbamoyl, alkoxycarbonyl or cyano, in 10 to 70 % sulfuric acid to prepare an imidazolyl acetic acid of the formula,

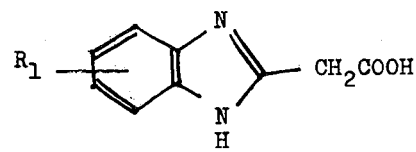

wherein $R_1$ is as defined above, and then reacting the imidazolyl acetic acid with a compound of the formula,

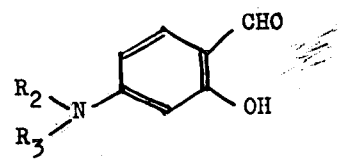

wherein $R_2$ and $R_3$ are as defined above, to obtain the dye (Ia), or further reacting the resulting dye (Ia) with an alkylating agent to obtain the dye (Ib).

10 Claims, No Drawings

METHOD RELATING TO MANUFACTURE OF COUMARIN DERIVATIVES

The present invention relates to a method for preparing a very useful coumarin type dye and quaternary salts thereof for coloration or dyeing of synthetic resins or synthetic fibers.

More particularly, the present invention relates to an improved method for preparing coumarin derivatives having the formula,

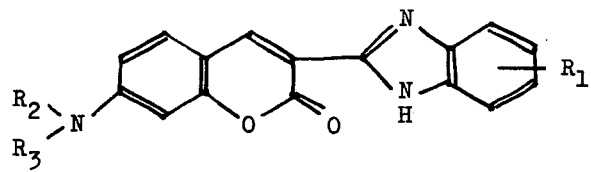

(Ia)

and quarternary salts thereof having the formula,

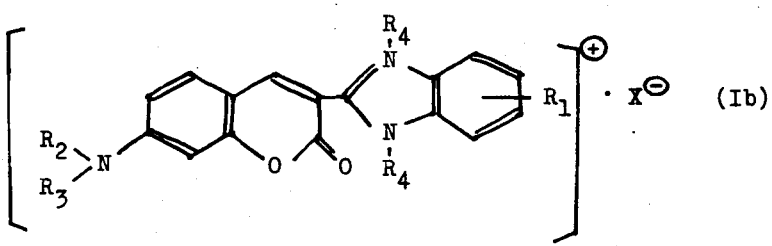

wherein $R_1$ is a hydrogen or chlorine atom, or a $C_1$-$C_2$ alkyl group, $R_2$ and $R_3$ are individually a hydrogen atom or a $C_1$-$C_4$ alkyl group, $R_4$ is a $C_1$-$C_2$ alkyl or benzyl group, and $X^-$ is an anion.

These dyes themselves, (Ia) and (Ib), are wellknown dyes. The dyes (Ia), which impart an intensely fluorescent greenish yellow shade to organic solvent when dissolved therein, can be used for coloration of synthetic resins such as polyethylene and polystyrene, and also for giving dyeings of brilliant greenish yellow shade on synthetic fibers such as polyester, acid-modified polyester and acid-modified polyamide from an aqueous dispersion bath thereof. On the other hand, the dyes (Ib) show outstanding features in dyeing of polyacrylonitrile fibers and acid-modified polyester fibers.

It is well known that these dyes can be prepared by the methods disclosed in Japanese Patent Publication No. 23738/1961 and No. 10186/1962, which are corresponding to British Patent No. 914347. These wellknown methods, however, are not industrially satisfactory owing to many reaction steps included therein and a low yield of each step.

Improvements in the methods are disclosed in unexamined Japanese Patent Publication No. 1188/1971, which is an improvement of the above Japanese Patent Publication No. 10186/1962, wherein the aimed dyes can be obtained directly by reacting 2-cyanomethylbenzimidazole and 4-diethylaminosalicylaldehyde in an acidic solution according to the following equation,

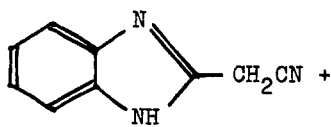

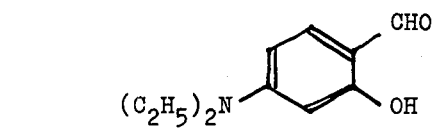

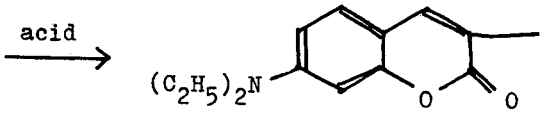

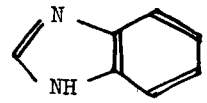

2-Cyanomethylbenzimidazole as a starting material is conventionally prepared by reacting o-phenylenediamine and cyanoacetic acid ester directly or in anhydrous solvents while heating, however the conventional methods can only give the product in a low yield and in a mixture with by-products, thereby making it difficult to obtain 2-cyanomethylbenzimidazole of high purity in a high yield. It is therefore clearly understood that the method of said unexamined Japanese Patent Publication is never industrially satisfactory in spite of its extremely unique process.

The inventors have studied to solve the problems and found that:

1. The dyes of the present invention can easily be obtained by use of 2-benzimidazolylacetic acid in place of 2-cyanomethylbenzimidazole in the above Japanese Publication No. 1188/1971. One example of the reaction process of the present invention is shown hereinafter together with that of the above Japanese Publication No. 1188/1971.

Process of the present invention:

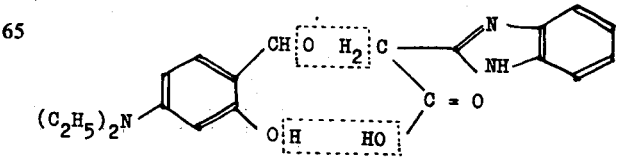

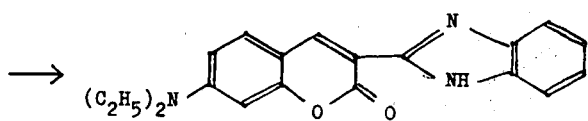

Process of the above Publication No. 1188/1971:

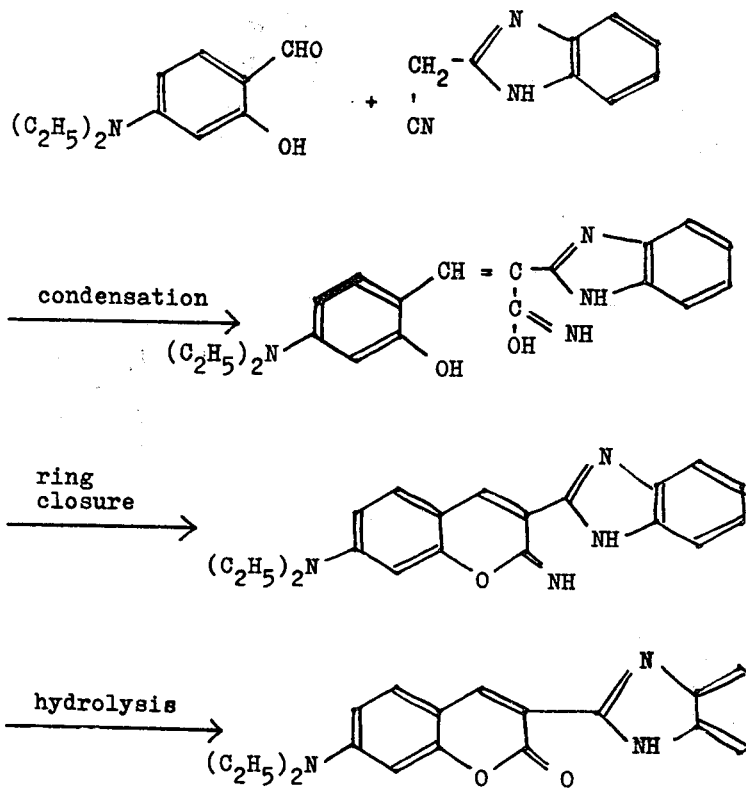

As can be seen from the reaction process involved in the present invention, the dyes can be obtained in one reaction step, not through the intermediate products as in the known process. The present reaction process, therefore, can reduce the reaction time to a large extent and can increase the yield remarkably.

2. 2-Benzimidazolylacetic acid can substantially quantitatively be obtained in a particular solvent, for example 10 to 70% sulfuric acid.

3. The acidic reaction solution after the preparation of 2-benzimidazolylacetic acid, can preferably be used as it is for the subsequent reaction, whereby the overall reaction from the preparation of starting material to the preparation of aimed dyes can be carried out in a single reaction vessel.

Thus, the present invention is based on the aforesaid knowledge and findings, and is to provide an improved method for preparing the dye of formula (Ia) or a quarternary salt thereof (Ib), which comprises reacting a diamine of the formula,

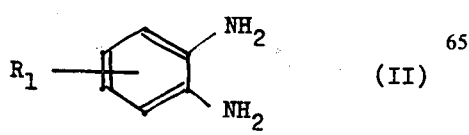 (II)

wherein $R_1$ is as defined above, with a compound of the formula, $$X - CH_2 - Y \qquad (III)$$

wherein X and Y may be the same or different and are each a carboxyl, carbamoyl, alkoxycarbonyl or cyano group, in a 10 to 70% sulfuric acid to prepare a benzimidazolyl acetic acid of the formula,

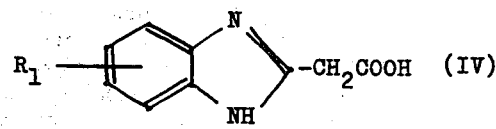 (IV)

wherein $R_1$ is as defined above, and then reacting the compound (IV) thus obtained with a hydroxybenzaldehyde of the formula,

 (V)

wherein $R_2$ and $R_3$ are as defined above, to obtain the dye of the formula (Ia), or further alkylating the dye of the formula (Ia) with an alkylating agent to obtain the dye of the formula (Ib).

The method of the present invention will be explained in more detail as follows. As the examples of diamines (II) which can be used in the present invention, there are particularly preferably exemplified o-phenylene diamine, 4- or 5-methyl-o-phenylenediamine and 4- or 5-chloro-o-phenylenediamine.

As the examples of the compound of the formula (III), there are exemplified malonic acid, malonic acid diesters, cyano acetic acid, cyano acetic acid esters, cyanoacetamide, N-alkylcyanoacetamides, allylamide and dicyanomethane.

As the examples of hydroxybenzaldehyde (V), there are preferably exemplified 2-hydroxy-4-dimethylaminobenzaldehyde, 2-hydroxy-4-aminobenaldehyde, 2-hydroxy-4-diethylaminobenzaldehyde, 2-hydroxy-4-ethylaminobenzaldehyde and 2-hydroxy-4-dibutylaminobenzaldehyde.

The compound of the formula (III) is used in an amount of at least 1 mole, preferably 1.05 to 1.1 moles, per mole of the diamine of the formula (II). The concentration of sulfuric acid used is satisfactorily 10 to 70 percent, and preferably 40 to 50 percent by weight. The reaction between the diamine (II) and the compound (III) can be completed by heating at about 90° to about 120°C. for about 3 to about 15 hours.

The proceeding of reaction can be followed with the lapse of time by chromatography, and the subsequent feeding can be carried out when all the diamines as a material have completely disappeared from the reaction system. When some amounts of diamines remain in the system by prolonged heating, the addition of a small amount of the compound (III) completes the reaction.

When a mineral acid other than sulfuric acid, for example hydrochloric acid is used, the formation of benzimidazolyl acetic acid becomes extremely slow, and in addition the diamine remains even by prolonged heating, so that a large amount of by-products are formed very disadvantageously in the subsequent coumarin-synthesizing reaction.

The use of nitric acid hardly gives the aimed product owing to side-reactions. With the use of sulfuric acid, the acid concentrations of less than 10% can not complete the reaction as in the case of hydrochloric acid, and on the other hand the high concentrations of more than 70% cause disadvantageously side-reactions followed by decomposition. Consequently the concentration is preferably within a range between 10 and 70 percent. The benzimidazolylacetic acid of the formula (IV) prepared by the present method can be isolated as a sulfate thereof from a very deeply cooled reaction solution. Therefore it is of course possible to isolate the derivatives after the completion of reaction and to react them with hydroxybenzaldehydes of the formula (V), however it is industrially advantageous to add the hydroxybenzaldehydes directly to the reaction system after the completion of reaction to react the two compounds in situ.

Compared with the method described in the Japanese Publication No. 23738/1961, No. 10186/1962 and No. 1188/1971 hereinbefore mentioned, the coumarin ring-formation of the present invention reaches an end quite quickly, as can be seen from the fact that the addition of the compound (V) causes the immediate separation of resulting coumarin compounds and complete the reaction within less than one-third the reaction time of the known methods.

After the completion of reaction between the diamine (II) and the compound (III) to obtain the benzimidazolyl acetic acid (IV), the hydroxybenzaldehyde (V) is added to the reaction mixture containing the benzimidazolyl acetic acid in an amount of at least one mole, preferably one mole, per mole of the benzimidazolyl acetic acid (V). The reaction is carried out at a temperature of about 50° to about 100°C. for about 30 to about 180 minutes.

Alternatively, after the completion of reaction between the diamine (II) and the compound (III), the benzimidazolyl acetic acid (IV) may be collected as the sulfate, and the sulfate may be reacted with the hydroxybenzaldehyde (V) in an aqueous hydrochloric acid or phosphoric acid solution under heating.

The products (Ia) thus obtained are in part dissolved in sulfuric acid in the form of sulfate thereof which can completely be separated by the dilution of the reaction mixture with water.

The diluted mixture is filtered as it is to permit a small amount of impurities to remain in the filtrate thereby giving high purity dyes in a high yield.

The dye thus obtained can be used as they are as a disperse dye or a coloring matter for synthetic resins. Furthermore the dyes (Ia) can be converted to the dyes (Ib) suitable for dyeing synthetic fibers such as polyacrylonitrile fibers, and acid-modified polyester and polyamide fibers by alkylating the imidazolyl ring of the dyes (Ia) with conventional alkylating agents such as dimethyl sulfate, diethyl sulfate, benzylchloride, methyl or ethyl bromide, methyl or ethyl benzenesulfonate and methyl or ethyl p-toluenesulfonate. The alkylation is carried out in an inert organic solvent such as methyl ethyl ketone, chlorobenzenes and sulfolane at a temperature of about 80° to about 130°C. for about 3 to about 7 hours. Acid binding agents such as magnesium oxide and potassium carbonate may be added to the reaction system. The resulting dye (Ib) is separated from the reaction mixture according to the conventional manner.

The present invention will be illustrated with reference to the following examples, which are only given for the purpose of illustration and not to be interpreted as limiting. The parts and percentages in the examples are by weight unless otherwise mentioned.

EXAMPLE 1

A mixture of 11.0 parts of o-phenylenediamine and 12.5 parts of ethyl cyanoacetate in 100 parts of a 50% sulfuric acid was heated under reflux while stirring until o-phenylenediamine disappeared from the system, during which it took about 10 hours.

To the reaction mixture containing 18 parts of the resulting 2-benzimidazolyl acetic acid were further added 19.7 parts of 2-hydroxy-4-diethylaminobenzaldehyde, and the mixture was heated at 90° to 95°C. for 1 hour while stirring. After the reaction was completed, the reaction mixture was adjusted under cooling to 3 to 4 of pH with a 20% aqueous caustic soda solution. Then the precipitated crystalline solids were filtered, washed thoroughly with water and dried to give 27 parts of the dye of the formula,

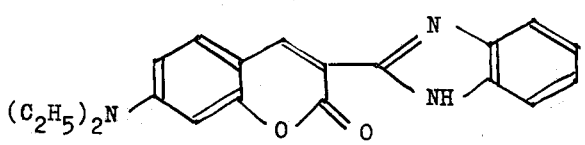

The dye thus obtained was able to dye polyester fibers in greenish yellow shades from its heated aqueous dispersion bath.

EXAMPLE 2

A mixture of 12.5 parts of 4-methyl-O-phenylenediamine and 9.3 parts of cyanoacetic acid in 100 parts of a 50% sulfuric acid was heated under reflux for 8 hours.

To the reaction mixture containing 19 parts of the resulting 2-(5'-methylbenzimidazolyl)-acetic acid were further added 19.3 parts of 2-hydroxy-4-diethylaminobenzaldehyde, and the mixture was heated at 90° to 95°C. for 1 hour while stirring.

After completion of the reaction, the reaction mixture was adjusted under cooling to 3 to 4 of pH with the addition of magnesium oxide in small partions. Then, the precipitated dye was filtered, washed with water and dried to give 27 parts of the dye of the formula,

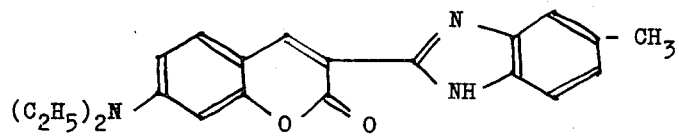

EXAMPLE 3

A mixture of 11.0 parts of o-phenylenediamine and 9.1 parts of cyanoacetamide in 100 parts of a 30% sulfuric acid was heated under reflux while stirring until o-phenylenediamine disappeared from the system, during which it took about 10 hours.

To the reaction mixture containing 18 parts of the resulting 2-benzimidazolyl acetic acid were further added 16.5 parts of 2-hydroxy-4-dimethylaminobenzaldehyde, and the mixture was heated at 90° to 95°C. for 1 hour while stirring. After the reaction was completed, the reaction mixture was adjusted under cooling to 3 to 4 of pH with a 20% aqueous caustic soda solution. Then the precipitated dye was filtered, thoroughly washed with water and dried to give 25.0 parts of the dye of the formula,

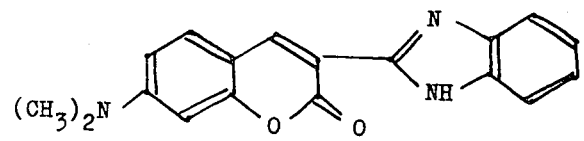

The dye thus obtained was able to dye polyester fibers in greenish yellow shades from its heated aqueous dispersion bath.

A similar dye was obtained with N-ethylcyanoacetamide in place of cyanoacetamide.

EXAMPLE 4

A mixture of 14.3 parts of 4-chloro-o-phenylenediamine and 7.3 parts of malonitrile in 100 parts of a 50% sulfuric acid was heated under reflux while stirring until 4-chloro-o-phenylenediamine disappeared from the system, during which it took about 12 hours.

To the reaction mixture containing 20 parts of the resulting 2-(5'-chloro-benzimidazolyl)-acetic acid were further added 19.3 parts of 2-hydroxy-4-diethylaminobenzaldehyde, and the mixture was heated at 90° to 95°C. for 5 hours while stirring. After the reaction was completed, the reaction mixture was adjusted under cooling to 3 to 4 of pH with a 20% aqueous caustic soda solution. Then the precipitated dye was filtered, thoroughly washed with water and dried to give 29.5 parts of the dye of the formula,

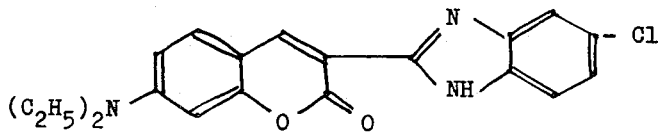

The dye thus obtained was able to dye polyester fibers in greenish yellow shades from its heated aqueous dispersion bath.

EXAMPLE 5

A mixture of 11.0 parts of o-phenylenediamine and 11.4 parts of malonic acid in 100 parts of a 50% sulfuric acid was heated under reflux while stirring. O-phenylenediamine disappeared after about 10 hours, when the reaction was completed.

To the reaction mixture containing 18 parts of 2-benzimidazolyl acetic acid were further added 19.7 parts of 2-hydroxy-4-diethylaminobenzaldehyde, and the mixture was heated at 90° to 95°C. for 3 hours while stirring.

After completion of the reaction, the reaction mixture was adjusted under cooling to 3 to 4 of pH with a 20% aqueous caustic soda solution. Then the precipitated dye was filtered, washed with water and dried to give 27.0 parts of the dye having the same chemical structure as that in Example 1.

The dye thus obtained was able to dye polyester fibers in greenish yellow shades from its heated aqueous dispersion bath.

EXAMPLE 6

The dyes listed in Table 1 were obtained in the same manner as described in Example 1, which gave dyeings of good fastnesses on polyester fibers.

EXAMPLE 7

To a mixture of 6.7 parts of the dye obtained in Example 1, 50 parts of Sulfolane (a registered trademark for tetrahydrothiophene-1,1-dioxide of Seitetsu Kagaku Co. Ltd.) and 2.8 parts of magnesium oxide were added dropwise 8.8 parts of dimethylsulfate at 70°C. while stirring. The system was heated to 90° to 100°C. and maintained at the same temperature for 5 hours while stirring. After the reaction was completed, the reaction solution was poured into 100 parts of water, acidified with a small amount of concentrated hydrochloric acid, and salted out with 15 parts of sodium chloride and 4.5 parts of zinc chloride. The precipitated dye was filtered, washed with a 10% aqueous sodium chloride solution and dried to give 100 parts of the dye of the formula,

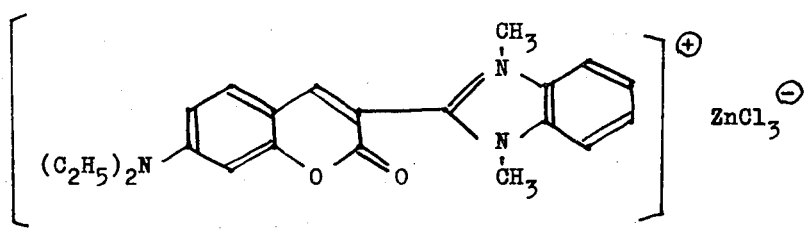

The dye salt thus obtained which was soluble in water in greenish yellow shades gave fluorescent greenish yellow dyeings of polyacrylonitrile fibers from a weakly acidic dyeing bath.

What is claimed is:

1. A method for preparing a coumarin dye of the formula (Ia),

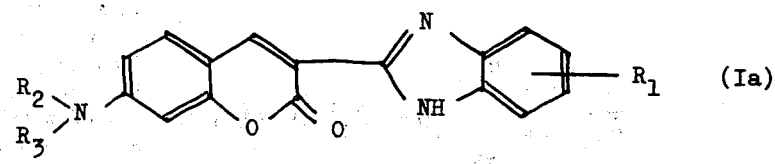

wherein $R_1$ is a hydrogen or chlorine atom, or a $C_1$-$C_2$ alkyl group, $R_2$ and $R_3$ are each a hydrogen atom or a $C_1$-$C_4$ alkyl group, or a quarternary salt of the dye (Ia) of the formula (Ib),

Table 1

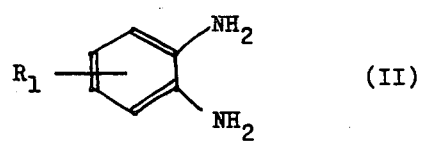

| $R_1$ | $R_2$ | $R_3$ | Shades on polyester fibers |
|---|---|---|---|
| H | H | H | Yellowish green |
| H | $C_4H_9$ | $C_4H_9$ | " |
| H | H | $C_2H_5$ | " |
| 5-$CH_3$ | H | H | " |
| 5-$CH_3$ | $C_4H_9$ | $C_4H_9$ | " |
| 5-$CH_3$ | H | $C_2H_5$ | " |
| 5-Cl | H | $C_2H_5$ | " |
| 5-$CH_3$ | $CH_3$ | $CH_3$ | " |
| 5-Cl | $CH_3$ | $CH_3$ | " |
| 5-Cl | $C_4H_9$ | $C_4H_9$ | " |

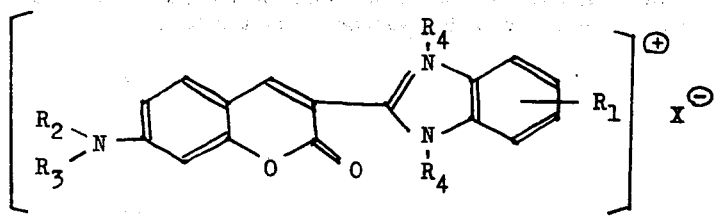

wherein $R_1$, $R_2$ and $R_3$ are as defined above, $R_4$ is a $C_1$-$C_2$ alkyl or benzyl group and $X^-$ is an anion, which comprises reacting a diamine of the formula (II),

(II)

wherein $R_1$ is as defined above, with a compound of the formula (III), $$X-CH_2-Y \qquad (III)$$

wherein X and Y may be the same or different, and are each a carboxyl, carbamoyl, alkoxycarbonyl or cyano group, in a 10 to 70% sulfuric acid to prepare a benzimidazolyl acetic acid of the formula (IV),

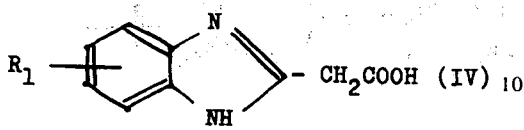

wherein $R_1$ is as defined above, and then reacting the compound thus obtained with a hydroxybenzaldehyde of the formula (V),

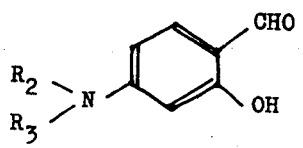

wherein $R_2$ and $R_3$ are as defined above, to obtain the dye of the formula (Ia), or reacting the resulting dye of the formula (Ia) with an alkylating agent to obtain the dye of the formula (Ib).

2. The method according to claim 1, wherein the diamine of the formula (II) is a member selected from the group consisting of o-phenylenediamine, 4- or 5-methyl-o-phenylenediamine and 4- or 5-chloro-o-phenylenediamine.

3. The method according to claim 1, wherein the compound of the formula (III) is a member selected from the group consisting of malonic acid, malonic acid diesters, cyanoacetic acid, cyanoacetic acid esters, cyanoacetamide, N-alkylcyanoacetamides, allylamide and dicyanomethane.

4. The method according to claim 1, wherein the hydroxybenzaldehyde of the formula (V) is a member selected from the group consisting of 2-hydroxy-4-dimethylaminobenzaldehyde, 2-hydroxy-4-aminobenzaldehyde, 2-hydroxy-4-diethylaminobenzaldehyde, 2-hydroxy-4-ethylaminobenzaldehyde and 2-hydroxy-4-dibutylaminobenzaldehyde.

5. The method according to claim 1, wherein the compound of the formula (III) is used in an amount of at least 1 mole per mole of the diamine of the formula (II).

6. The method according to claim 1, wherein the hydroxybenzaldehyde of the formula (V) is used in an almost equimolar amount to the benzimidazolyl acetic acid of the formula (IV).

7. The method according to claim 1, wherein the reaction between the diamine of the formula (II) and the compound (III) is carried out at a temperature of about 90° to about 120°C. for about 3 to about 15 hours.

8. The method according to claim 1, wherein the reaction between the benzimidazolyl acetic acid of the formula (IV) and the hydroxybenzaldehyde of the formula (V) is carried out at a temperature of about 50° to about 100°C. for about 30 to about 180 minutes.

9. The method according to claim 1, wherein the alkylating agent is a member selected from one group consisting of dimethyl sulfate, diethyl sulfate, benzyl chloride. methyl bromide, ethyl bromide, methyl benzenesulfonate, ethyl benzenesulfonate, methyl p-toluenesulfonate and ethyl p-toluenesulfonate.

10. The method according to claim 1, wherein the alkylation is carried out in an inert organic solvent at a temperature of about 80° to about 130°C.

* * * * *